H. A. & N. KRAUSE.
LINE WINDING MECHANISM.
APPLICATION FILED APR. 20, 1908.

905,329.

Patented Dec. 1, 1908.

WITNESSES
Edward Hoernel
James G. Bennett

INVENTORS
Hans A. Krause
and
Norman Krause
By their Attorney

UNITED STATES PATENT OFFICE.

HANS A. KRAUSE AND NORMAN KRAUSE, OF RACINE, WISCONSIN.

LINE-WINDING MECHANISM.

No. 905,329.   Specification of Letters Patent.   Patented Dec. 1, 1908.

Application filed April 20, 1908. Serial No. 428,250.

*To all whom it may concern:*

Be it known that we, HANS A. KRAUSE and NORMAN KRAUSE, citizens of the United States, and residents of Racine, in the county of Racine and State of Wisconsin, have invented certain new and useful Improvements in Line-Winding Mechanism, of which the following is a specification.

Figure 1:
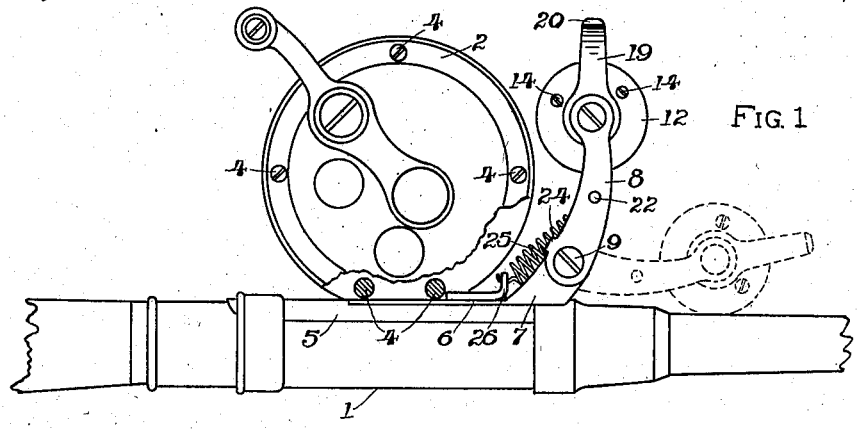
Figure 2:
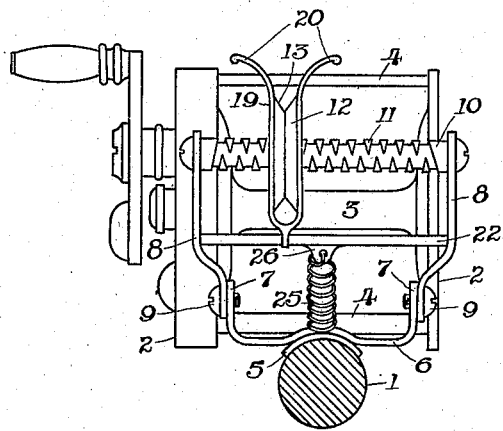
Figure 3:
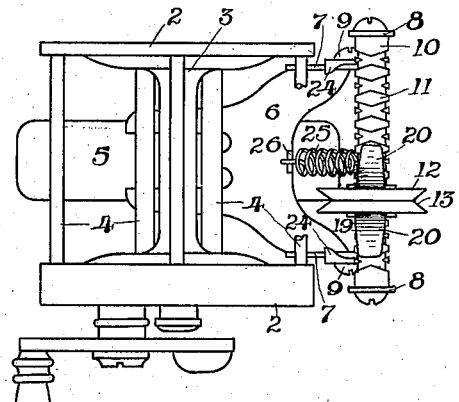
Figures 4, 5:
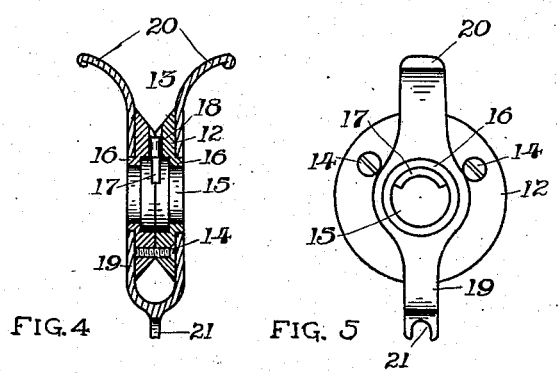
Figure 6:
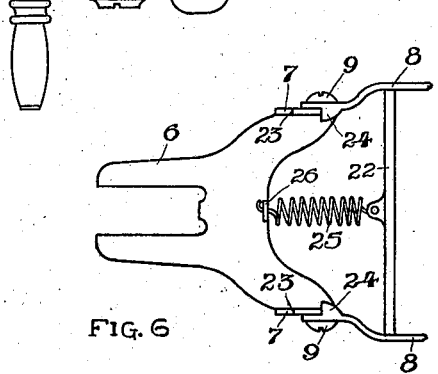

Our invention relates to line winding mechanism, and is designed to be applicable in particular to fishing reels; its object being to provide a mechanism that will in its operation cause the line to move evenly and positively along the axis of the spool when being wound thereon, said mechanism being actuated by means of frictional contact of the line during the winding movement, and released from such contact when the line is being unwound from the spool. We attain these objects by means of the mechanism illustrated in the accompanying drawing, in which, Figure 1 represents an end elevation of a fishing reel having our improved line guiding attachment mounted adjacent thereto; Fig. 2 is a front side elevation of Fig. 1; Fig. 3 is a top view of Fig. 1; Fig. 4 is a cross section of a combined nut and line guiding member; Fig. 5 is a side elevation of the nut shown in Fig. 4; and Fig. 6 is a plan view of the frame structure in which the line guiding mechanism is mounted.

The same reference numerals designate like parts throughout the several views.

1 represents a fishing rod upon which is mounted a reel of ordinary construction, having the fixed side members 2, in which a spool 3 is rotatably mounted; the side members being connected by means of cross rods 4; and 5 represents the base-plate secured to the two lower cross-rods and by means of which the reel mechanism is secured to the rod.

In operating the type of reel illustrated, trouble has been experienced by reason of the line being wound unevenly upon the spool, owing to the absence of means operative to cause it to steadily travel from end to end of the spool along its axis of rotation while being wound thereon.

In our line guiding mechanism we preferably provide an attachment that may be operated in connection with any of the various forms of fishing reels to be found in the market. It includes a base-plate 6, preferably formed in a manner to be received between the lower cross-bars 4 of the type of reel illustrated, and the base plate 5; it being obvious that other means may be employed for supporting the base-plate 6 and connecting it with the rod if desired. The outer end of member 6 is provided with upturned vertically arranged ear portions 7 upon its opposite edges, and 8 represents side members of a frame structure in which the movable members of the line guiding mechanism are mounted; said side members having their lower ends pivotally connected with the ear portions 7 by means of the pivot studs 9, and 10 represents a rod having its opposite ends rigidly connected with the upper ends of the side members 8 and having formed thereon right and left hand screw threads 11 of a well known form, upon which is mounted a rotatable nut 12, having a V shaped periphery 13; the nut being formed in two parts for convenience of manufacture, the parts being secured together by means of screws 14, and having an axial opening 15 therethrough, and annular collars 16 at opposite sides thereof.

17 represents a thread engaging semicircular shoe having a radial shank portion 18 pivotally received by the nut in a manner to vibrate therein in a manner to engage alternately with the right and left threads upon the nonrotatable member 10; and 19 represents a yoke embracing the nut and provided with openings that loosely receive the collars 16; the upper end of said yoke being provided with oppositely curved fork members 20 adapted to guide the line toward the nut and retain it in contact with the V shaped periphery thereof; the lower end of said yoke being provided with a slotted opening 21 that loosely receives a cross-rod 22, said cross-rod having its opposite ends secured to the side members 8 intermediate the axis of their movement and said threaded member.

23 represents shoulders formed on the ear portions 7 and designed to contact with inturned lip portions 24 integral with the side members 8 in a manner to limit a swinging movement of the line guiding frame in a direction toward the reel mechanism; and 25 represents a tension spring having one end secured to an ear 26 forming part of the base 6, and its opposite end connected with the cross rod 22; the spring being operative to yieldingly hold the line guiding frame in a vertical operative position with the lips 24 in contact with the shoulders 23, as shown in full lines in Fig. 1.

When the line guiding mechanism is mounted upon the rod, the axis of the swinging frame is in a plane far enough above that of the point of connection of the spring 24 with the base, to allow the cross rod 22 to swing below the axis of the frame when it is swung outward and downward as shown by dotted lines in Fig. 1 and the tension of the spring is operative to yieldingly hold it in that positon.

In operating the device, the line is wound in by the operation of the reel mechanism, with the line guiding frame swung to a vertical position and the line placed between the curved guide forks that direct it upon the V shaped periphery of the nut; the latter being caused to rotate by means of frictional contact with the line, will traverse the right and left threaded member from end to end as it engages alternately with the oppositely disposed threads, thereby causing the line to be evenly wound upon the reel spool. When it is desired to unwind the line, as in casting, the line guide frame is turned to a horizontal position and the line is then free to run out unaffected by the guiding mechanism.

What we claim as being our invention and what we desire to secure by Letters Patent is:

1. A line winding mechanism including in combination, a spool, a fixed frame having said spool rotatably mounted therein, a line guiding mechanism including a swinging frame, a nonrotatable right and left screw threaded rod mounted in said frame adjacent said spool and substantially parallel with the axis thereof, a rotatable nut engaging with said threaded rod and having its periphery adapted to engage frictionally with a line, and a nonrotatable member carried by said nut and adapted to direct a line toward its periphery.

2. A line winding mechanism including in combination, a spool, a fixed frame having said spool rotatably mounted thereon, a line guiding mechanism including a swinging frame detachably connected with said fixed frame, a nonrotatable right and left screw threaded rod mounted in said swinging frame adjacent said spool and substantially parallel with the axis thereof, a rotatable nut engaging with said threaded rod and having its periphery adapted to engage frictionally with a line, and a nonrotatable member carried by said nut and having oppositely disposed fork members adapted to guide a line toward the periphery of said nut.

3. A line winding mechanism including in combination, a spool, a fixed frame having said spool rotatably mounted therein, said fixed frame including plates at opposite ends of said spool and tie rods connecting said plates, a base plate secured to said tie rods, a line guiding frame including a fixed member adapted to be received and frictionally held between one or more of said tie rods and said base plate.

4. A line winding mechanism including in combination, a rotatable spool, a line guiding mechanism including a nonrotatable member arranged substantially parallel with the axis of said spool and having right and left screw threads formed thereon, a frame pivotally supported adjacent said spool, said frame including side members, and a rod having its opposite ends secured to said side members, a nut having a V shaped periphery and engaging with said nonrotatable member, said nut being caused to rotate by means of frictional contact of the line with its V shaped periphery, and a yoke carried by said nut and secured against rotation by means of engagement of one of its ends with said rod and having its opposite end adapted to guide the line toward and retain it in operative contact with said nut.

5. A line winding mechanism including in combination, a rotatable spool, a line guiding mechanism including a nonrotatable member arranged substantially parallel with the axis of said spool and having right and left screw threads formed thereon, a frame pivotally supported adjacent said spool, said frame including side members and a rod having its opposite ends secured to said side members, said nonrotatable member having its opposite ends secured to said side members, a nut having a V shaped periphery and engaging with said nonrotatable member, said nut being caused to rotate by means of frictional contact of the line with its V shaped periphery, a yoke engaging with opposite sides of said nut and having one end slidably engaging with said rod and its opposite end adapted to guide the line toward the nut and retain it in operative contact therewith.

6. A line winding mechanism including in combination, a reel frame having a rotatable spool mounted therein, a line guiding mechanism including a nonrotatable member arranged substantially parallel with the axis of said spool and having right and left screw threads formed thereon, a frame having said nonrotatable member secured therein, said frame including a base-plate adapted to be detachably connected with said reel frame, vertically arranged frame members having their lower ends pivotally connected with said base-plate and their upper ends secured to opposite ends of said right and left threaded member, a stop to limit the movement of said pivoted members in one direction, and a spring operative to hold said members against said stop.

7. A line winding mechanism including in combination, a reel frame having a rotatable spool mounted therein, a line guiding mechanism including a nonrotatable member arranged substantially parallel with the axis of said spool and having right and left screw threads formed thereon, a frame having said nonrotatable member secured therein, said frame including a base-plate adapted to be detachably connected with said reel-frame, vertically arranged frame members having their lower ends pivotally connected with said base-plate and their upper ends secured to opposite ends of said nonrotatable threaded member, a rod having its opposite ends secured to said pivoted members intermediate the axis of their pivotal connection and said threaded member, a stop to limit the movement of said pivoted members in one direction and a tension spring having one end connected with said base plate and its opposite end with said rod, said spring being operative to yieldingly hold said member against said stop.

HANS A. KRAUSE.
NORMAN KRAUSE.

Witnesses:
ARTHUR EHRLICH,
EDW. HOEMEL.